United States Patent
Onyon et al.

(10) Patent No.: US 7,587,446 B1
(45) Date of Patent: Sep. 8, 2009

(54) ACQUISITION AND SYNCHRONIZATION OF DIGITAL MEDIA TO A PERSONAL INFORMATION SPACE

(75) Inventors: Richard M. Onyon, San Jose, CA (US); David L. Multer, Santa Cruz, CA (US)

(73) Assignee: FusionOne, Inc., San Jose, CA (US)

( * ) Notice: Subject to any disclaimer, the term of this patent is extended or adjusted under 35 U.S.C. 154(b) by 580 days.

(21) Appl. No.: 09/710,162

(22) Filed: Nov. 10, 2000

(51) Int. Cl.
*G06F 15/16* (2006.01)
*G06F 15/173* (2006.01)

(52) U.S. Cl. .................. 709/203; 709/217; 707/10; 707/204

(58) Field of Classification Search ......... 709/200–203, 709/217–228, 230–232, 236–238, 243, 244, 709/246, 248; 707/10, 200, 201, 203, 204; 719/310, 311, 312, 313, 317, 318, 328; 718/100, 718/105; 455/415; 370/254, 359; 708/204; 345/62

See application file for complete search history.

(56) References Cited

U.S. PATENT DOCUMENTS

| | | | |
|---|---|---|---|
| 5,130,993 A | 7/1992 | Gutman et al. | |
| 5,392,390 A | 2/1995 | Crozier | |
| 5,519,606 A | 5/1996 | Frid-Nielsen et al. | |
| 5,574,906 A | 11/1996 | Morris | |
| 5,623,661 A | 4/1997 | Hon | |
| 5,628,005 A | 5/1997 | Hurvig | |
| 5,630,081 A | 5/1997 | Rybicki et al. | |
| 5,649,195 A | 7/1997 | Scott et al. | |
| 5,666,553 A | 9/1997 | Crozier | |
| 5,682,524 A | 10/1997 | Freund et al. | |
| 5,684,990 A | 11/1997 | Boothby | |
| 5,694,596 A | 12/1997 | Campbell | |
| 5,701,423 A | 12/1997 | Crozier | |
| 5,706,509 A | 1/1998 | Man-Hak Tso | |
| 5,710,922 A | 1/1998 | Alley et al. | |
| 5,727,202 A | 3/1998 | Kucala | |
| 5,729,735 A | 3/1998 | Meyering | |
| 5,729,739 A * | 3/1998 | Cantin et al. ............ 707/103 R |
| 5,729,743 A | 3/1998 | Squibb | |
| 5,742,792 A | 4/1998 | Yanai et al. | |

(Continued)

FOREIGN PATENT DOCUMENTS

EP 0 986 225 A1 3/2000

(Continued)

OTHER PUBLICATIONS

Internate Mail Consortium: "vCard The Electronic Business Card," Retrieved from the Internet: www.imc.org/pdi/vcardwhite.html, Jan. 1, 1997.

(Continued)

*Primary Examiner*—Haresh N Patel
(74) *Attorney, Agent, or Firm*—Haverstock & Owens LLP

(57) ABSTRACT

A method for transferring media data to a network coupled apparatus is described. The method includes maintaining a personal information space identified with a user and having media data. The personal information space is coupled to the network. Upon a user request, the method transfers at least a portion of the media data from the personal information space to the network coupled apparatus in a differencing transaction.

14 Claims, 5 Drawing Sheets

U.S. PATENT DOCUMENTS

| | | | |
|---|---|---|---|
| 5,745,906 A | 4/1998 | Squibb | |
| 5,758,150 A | 5/1998 | Bell et al. | |
| 5,768,597 A | 6/1998 | Simm | |
| 5,771,354 A | 6/1998 | Crawford | |
| 5,778,346 A | 7/1998 | Frid-Nielsen et al. | |
| 5,787,247 A | 7/1998 | Norin et al. | |
| 5,787,262 A | 7/1998 | Shakib et al. | |
| 5,809,497 A | 9/1998 | Freund et al. | |
| 5,812,773 A | 9/1998 | Norin | |
| 5,812,793 A | 9/1998 | Shakib et al. | |
| 5,832,489 A | 11/1998 | Kucala | |
| 5,832,519 A | 11/1998 | Bowen et al. | |
| 5,845,283 A | 12/1998 | Williams et al. | |
| 5,875,296 A | 2/1999 | Shi et al. | |
| 5,884,323 A | 3/1999 | Hawkins et al. | |
| 5,884,325 A | 3/1999 | Bauer et al. | |
| 5,893,119 A | 4/1999 | Squibb | |
| 5,897,640 A | 4/1999 | Veghte et al. | |
| 5,897,642 A | 4/1999 | Capossela et al. | |
| 5,907,793 A * | 5/1999 | Reams | 725/122 |
| 5,937,405 A | 8/1999 | Campbell | |
| 5,943,676 A | 8/1999 | Boothby | |
| 5,961,590 A | 10/1999 | Mendez et al. | |
| 5,968,131 A | 10/1999 | Mendez et al. | |
| 5,974,238 A | 10/1999 | Chase, Jr. | |
| 5,974,563 A | 10/1999 | Beeler, Jr. | |
| 6,000,000 A | 12/1999 | Hawkins et al. | |
| 6,006,274 A | 12/1999 | Hawkins et al. | |
| 6,012,063 A | 1/2000 | Bodnar | |
| 6,016,394 A * | 1/2000 | Walker | 717/104 |
| 6,016,478 A | 1/2000 | Zhang et al. | |
| 6,023,708 A | 2/2000 | Mendez et al. | |
| 6,023,723 A | 2/2000 | McCormick et al. | |
| 6,034,621 A | 3/2000 | Kaufman | |
| 6,038,665 A | 3/2000 | Bolt et al. | 713/176 |
| 6,044,381 A | 3/2000 | Boothby et al. | |
| 6,052,735 A | 4/2000 | Ulrich et al. | |
| 6,058,399 A | 5/2000 | Morag et al. | |
| 6,061,790 A | 5/2000 | Bodnar | |
| 6,064,880 A | 5/2000 | Alanara | 455/419 |
| 6,108,330 A | 8/2000 | Bhatia et al. | 370/352 |
| 6,108,703 A | 8/2000 | Leighton et al. | 709/226 |
| 6,131,096 A | 10/2000 | Ng et al. | |
| 6,131,116 A | 10/2000 | Riggins et al. | |
| 6,141,011 A | 10/2000 | Bodnar et al. | |
| 6,141,664 A | 10/2000 | Boothby | |
| 6,151,606 A | 11/2000 | Mendez | |
| 6,163,844 A | 12/2000 | Duncan et al. | 713/201 |
| 6,182,117 B1 | 1/2001 | Christie et al. | |
| 6,182,141 B1 | 1/2001 | Blum et al. | 709/227 |
| 6,185,598 B1 | 2/2001 | Farber et al. | 709/200 |
| 6,202,085 B1 | 3/2001 | Benson et al. | |
| 6,205,448 B1 | 3/2001 | Kruglikov et al. | |
| 6,212,529 B1 | 4/2001 | Boothby et al. | |
| 6,216,131 B1 | 4/2001 | Liu et al. | |
| 6,219,694 B1 | 4/2001 | Lazaridis et al. | |
| 6,223,187 B1 | 4/2001 | Boothby et al. | |
| 6,226,650 B1 | 5/2001 | Mahajan et al. | |
| 6,247,135 B1 | 6/2001 | Feague | |
| 6,260,124 B1 | 7/2001 | Crockett et al. | 711/162 |
| 6,272,545 B1 | 8/2001 | Flanagin et al. | |
| 6,275,831 B1 | 8/2001 | Bodnar et al. | |
| 6,282,698 B1 | 8/2001 | Baker et al. | |
| 6,295,541 B1 | 9/2001 | Bodnar et al. | |
| 6,304,881 B1 | 10/2001 | Halim et al. | |
| 6,317,755 B1 | 11/2001 | Rakers et al. | 707/204 |
| 6,324,544 B1 | 11/2001 | Alam et al. | |
| 6,330,568 B1 | 12/2001 | Boothby et al. | |
| 6,332,158 B1 | 12/2001 | Risley et al. | 709/219 |
| 6,363,249 B1 | 3/2002 | Nordeman et al. | 455/418 |
| 6,363,412 B1 | 3/2002 | Niwa et al. | 709/203 |
| 6,389,462 B1 | 5/2002 | Cohen et al. | 709/218 |
| 6,396,482 B1 | 5/2002 | Griffin et al. | 345/169 |
| 6,397,351 B1 | 5/2002 | Miller et al. | |
| 6,401,104 B1 * | 6/2002 | LaRue et al. | 707/203 |
| 6,405,218 B1 | 6/2002 | Boothby | |
| 6,434,621 B1 * | 8/2002 | Pezzillo et al. | 709/231 |
| 6,434,627 B1 | 8/2002 | Millet et al. | 709/245 |
| 6,437,818 B1 * | 8/2002 | Ludwig et al. | 348/14.09 |
| 6,449,622 B1 | 9/2002 | LaRue et al. | |
| 6,457,062 B1 | 9/2002 | Pivowar et al. | |
| 6,480,896 B1 * | 11/2002 | Brown et al. | 709/231 |
| 6,484,143 B1 | 11/2002 | Swildens et al. | 705/1 |
| 6,487,560 B1 | 11/2002 | LaRue et al. | |
| 6,549,933 B1 * | 4/2003 | Barrett et al. | 709/203 |
| 6,553,413 B1 | 4/2003 | Leighton et al. | 709/219 |
| 6,567,850 B1 * | 5/2003 | Freishtat et al. | 709/224 |
| 6,591,306 B1 | 7/2003 | Redlich | 709/245 |
| 6,597,700 B2 | 7/2003 | Golikeri et al. | 370/401 |
| 6,640,302 B1 | 10/2003 | Subramaniam et al. | 713/169 |
| 6,643,707 B1 | 11/2003 | Booth | 709/245 |
| 6,671,724 B1 | 12/2003 | Pandya et al. | 709/226 |
| 6,671,757 B1 * | 12/2003 | Cash et al. | 710/100 |
| 6,694,336 B1 * | 2/2004 | Multer et al. | 707/201 |
| 6,718,390 B1 | 4/2004 | Still et al. | 709/229 |
| 6,732,101 B1 | 5/2004 | Cook | 707/10 |
| 6,738,789 B2 * | 5/2004 | Multer et al. | 707/201 |
| 6,757,696 B2 * | 6/2004 | Multer et al. | 707/201 |
| 6,757,698 B2 | 6/2004 | McBride et al. | 707/204 |
| 6,799,214 B1 | 9/2004 | Li | 709/226 |
| 6,804,690 B1 | 10/2004 | Dysert et al. | 707/204 |
| 6,804,783 B1 | 10/2004 | Wesinger, Jr. et al. | 713/200 |
| 6,812,961 B1 * | 11/2004 | Parulski et al. | 348/231.2 |
| 6,839,568 B2 | 1/2005 | Suzuki | 455/550.1 |
| 6,850,944 B1 * | 2/2005 | MacCall et al. | 707/100 |
| 6,870,921 B1 * | 3/2005 | Elsey et al. | 379/218.01 |
| 6,892,245 B1 | 5/2005 | Crump et al. | 709/245 |
| 6,920,488 B1 | 7/2005 | Le Pennec et al. | 709/219 |
| 6,944,651 B2 * | 9/2005 | Onyon et al. | 709/217 |
| 6,954,783 B1 | 10/2005 | Bodwell et al. | 709/218 |
| 6,963,914 B1 | 11/2005 | Breitbart et al. | 709/226 |
| 6,996,631 B1 | 2/2006 | Aiken, Jr. et al. | 709/242 |
| 7,003,555 B1 | 2/2006 | Jungck | 709/219 |
| 7,007,041 B2 * | 2/2006 | Multer et al. | 707/201 |
| 7,020,704 B1 * | 3/2006 | Lipscomb et al. | 709/226 |
| 7,023,868 B2 | 4/2006 | Rabenko et al. | 370/419 |
| 7,039,656 B1 * | 5/2006 | Tsai et al. | 707/201 |
| 7,051,275 B2 * | 5/2006 | Gupta et al. | 715/201 |
| 7,054,594 B2 | 5/2006 | Bloch et al. | 455/41.2 |
| 7,116,681 B1 | 10/2006 | Hovell et al. | 370/466 |
| 7,162,494 B2 | 1/2007 | Arellano | 707/104.1 |
| 7,197,574 B1 | 3/2007 | Ishiyama | 709/245 |
| 7,233,791 B2 | 6/2007 | Gilbert et al. | 455/419 |
| 7,249,175 B1 | 7/2007 | Donaldson | 709/225 |
| 7,269,433 B2 | 9/2007 | Vargas et al. | 455/502 |
| 7,284,051 B1 | 10/2007 | Okano et al. | 709/226 |
| 7,289,964 B1 | 10/2007 | Bowman-Amuah | 705/1 |
| 7,315,826 B1 * | 1/2008 | Guheen et al. | 705/7 |
| 7,356,559 B1 | 4/2008 | Jacobs et al. | 709/203 |
| 7,363,233 B1 | 4/2008 | Levine | 705/1 |
| 7,392,034 B2 | 6/2008 | Westman et al. | 455/402 |
| 7,447,743 B1 | 11/2008 | Jordan, Jr. | 709/206 |
| 7,454,500 B1 | 11/2008 | Hsu et al. | 709/226 |
| 2001/0044805 A1 | 11/2001 | Multer et al. | |
| 2001/0047393 A1 * | 11/2001 | Arner et al. | 709/216 |
| 2002/0007303 A1 * | 1/2002 | Brookler et al. | 705/10 |
| 2002/0010868 A1 | 1/2002 | Nakashima et al. | 713/201 |
| 2002/0032751 A1 | 3/2002 | Bharadwaj | 709/218 |
| 2002/0038316 A1 * | 3/2002 | Onyon et al. | 707/204 |
| 2002/0040369 A1 * | 4/2002 | Multer et al. | 707/201 |
| 2002/0049852 A1 * | 4/2002 | Lee et al. | 709/231 |
| 2002/0056011 A1 | 5/2002 | Nardone et al. | 709/248 |
| 2002/0059116 A1 | 5/2002 | Bulatovic et al. | 705/27 |
| 2002/0091785 A1 * | 7/2002 | Ohlenbusch et al. | 709/208 |

| | | | |
|---|---|---|---|
| 2002/0138765 A1 | 9/2002 | Fishman et al. | |
| 2002/0162011 A1 | 10/2002 | Tanaka et al. | 713/200 |
| 2003/0028451 A1 | 2/2003 | Ananian | 705/27 |
| 2003/0069874 A1* | 4/2003 | Hertzog et al. | |
| 2003/0204568 A1 | 10/2003 | Bhargava et al. | 709/206 |
| 2003/0229898 A1 | 12/2003 | Babu et al. | 725/87 |
| 2004/0054746 A1 | 3/2004 | Shibata | 709/207 |
| 2004/0093342 A1* | 5/2004 | Arbo et al. | 707/102 |
| 2004/0093385 A1 | 5/2004 | Yamagata | 709/206 |
| 2004/0111465 A1 | 6/2004 | Chuang et al. | 709/203 |
| 2004/0188235 A1 | 9/2004 | Sugimoto et al. | 455/412.1 |
| 2004/0192282 A1 | 9/2004 | Vasudevan | 455/419 |
| 2004/0224665 A1 | 11/2004 | Kokubo | 455/411 |
| 2005/0086296 A1 | 4/2005 | Chi et al. | 709/203 |
| 2005/0090253 A1 | 4/2005 | Kim et al. | 455/435.1 |
| 2005/0099963 A1* | 5/2005 | Multer et al. | 370/254 |
| 2005/0102257 A1* | 5/2005 | Onyon et al. | 707/1 |
| 2005/0131990 A1 | 6/2005 | Jewell | 709/201 |
| 2006/0052091 A1* | 3/2006 | Onyon et al. | 455/415 |
| 2006/0190626 A1 | 8/2006 | Bhogal et al. | 709/248 |
| 2007/0050734 A1 | 3/2007 | Busey | 715/853 |
| 2007/0061331 A1 | 3/2007 | Ramer et al. | 707/10 |
| 2007/0094042 A1 | 4/2007 | Ramer et al. | 705/1 |
| 2008/0022220 A1 | 1/2008 | Cheah | 715/769 |
| 2008/0039020 A1 | 2/2008 | Eskin | 455/41.2 |

FOREIGN PATENT DOCUMENTS

| | | |
|---|---|---|
| EP | 1180890 A2 | 2/2002 |
| JP | 11242620 | 7/1999 |
| JP | 11242677 | 7/1999 |
| WO | WO 97 04391 | 2/1997 |
| WO | WO 97/41520 | 11/1997 |
| WO | WO 98/21648 | 5/1998 |
| WO | WO 98/54662 | 12/1998 |
| WO | WO 99/05813 | 2/1999 |
| WO | WO 99/06900 | 2/1999 |
| WO | WO 99/36870 | 7/1999 |
| WO | WO 99/45451 | 9/1999 |
| WO | WO 99/45484 | 9/1999 |
| WO | WO 99/50761 | 10/1999 |
| WO | WO 00/11832 | 3/2000 |
| WO | WO 00/16222 | 3/2000 |
| WO | WO 00/29998 | 5/2000 |
| WO | WO 01/71539 | 9/2001 |
| WO | WO 2005/112586 A2 | 12/2005 |

OTHER PUBLICATIONS

Intemate Mail Consortium: "vCard Overview," Retrieved from the internet: www.imc.org/pdi/vcardoverview.html, Oct. 13, 1998.

Intemate Mail Consortium: "vCard The Electronic Bisiness Card," Retrieved from the Internet: www.imc.org/pdi/vcardwhite.html, Jan. 1, 1997, pp. 1-2.

Intemate Mail Consortium: "vCard Overview," retrieved from the Internet: www.imc.org/pdi/vcardoverview.html, Oct. 13, 1998, pp. 1-3.

Finnigan, Anne, "The Safe Way to Shop Online," Sep. 1998, p. 162, Good Housekeeping, v. 227 No. 3.

Chase, Larry, "Taking Transactions Online,"Oct. 1998, pp. 124-132, Target Marketing, v.21 No. 10.

Gong, Li, "Increasing Availability and Security of an Authentication Service," Jun. 1993, pp. 657-662, IEEE Journal on Selected Areas in Communications, v. 11 No. 5.

DeMaio, Harry B., "My MIPS Are Sealed," Sep./Oct. 1993, pp. 46-51, Chief Information Officer Journal v. 5 iss.7.

* cited by examiner

Device Engine

ACQUISITION AND SYNCHRONIZATION OF DIGITAL MEDIA TO A PERSONAL INFORMATION SPACE

CROSS-REFERENCE TO RELATED APPLICATIONS

The following applications are cross-referenced and incorporated by reference herein in their entirety:

"Data Transfer and Synchronization System," U.S. Pat. No. 6,671,757, issued Dec. 30, 2003;

"Data Transfer and Synchronization System," U.S. Pat. No. 6,694,336, issued Feb. 17, 2004; and "Data Transfer and Synchronization System," U.S. patent application Ser. No. 09/491,675, filed Jan. 26, 2000.

Each of these related Patents/Application are incorporated herein by reference.

BACKGROUND OF THE INVENTION

1. Field of the Invention

The invention relates to the transfer of public and private data to a private information space and in particular to the transfer, storage and synchronization of media data.

2. Description of the Related Art

Digital media has become increasingly more popular and is considered by many to be one of the current "revolutions" taking place in the computing and entertainment industries. Digital audio and video are becoming as mainstream as text and graphics are on the World Wide Web. This "revolution" opens tremendous opportunities for industry innovation in the manner in which people use this technology at home, work, and on the road. Distribution of digital media via the Internet has been a driving factor of this revolution. As a result, however, a user may acquire and store digital media on one network-coupled device, such as a personal computer coupled to the user's business network connection, but may desire to transfer that information and maintain a library of this digital media on other network-coupled devices, such as a personal computer at the user's home, a notebook computer which travels with the user, or even a palm-top computer.

Digital media content can be acquired from a multiplicity of sources. In particular, digital media content can comprise a series of files such as MPEG, MP3, RealAudio, and the like, which may be saved to a storage device, such as a hard drive on a computer, and which a user may wish to have present on a multiplicity of the user's individual devices. At present, there is no way to ensure that all files of a particular type, or in a particular directory, are the same throughout a series of machines. This series of machines can comprise a "personal information space" which is made up of information selected by the user to be input into the user's own hard drive. Hence, the personal information space may comprise public or private data selected by the user which is inserted into any one or more of a user's network-coupled devices. The network-coupled devices can have their own storage or which may be connected to the network to receive data from the network and to process the data using the device's processor and software.

In other areas, management of a user's personal data between different systems which can couple directly to each other has been addressed. For example, numerous systems allow management of an individual's personal contact information, such as files, contact and address data. Personal information managers (PIMs) may comprise software applications such as Microsoft Outlook, Symantec's ACT!, and other similar programs running on a personal or laptop computer. PIMS may also comprise personal digital assistants (PDAs) such as those using the Palm or Microsoft Windows CE (also known as Pocket PC) operating systems. Each PDA generally includes calendar, contact, personal tasks, notes, documents, and other information, while more sophisticated devices allow a user to fax, send e-mails, and communicate in other ways both by wireline and wirelessly. Even advanced cellular phones carry enough memory and processing power to store contact information, surf the web, and provide text messaging. Along with the growth in the sophistication of these devices, the need to transfer information between them has grown significantly as well.

In addition, many Internet web portals also now provide file storage, contact and calendar services. For example, major service portals such as Yahoo!™, Excite$^{SM}$, Lycos®, Snap!™ and others provide on-line calendar and contact manager services via a web browser and user account. This allows a user to log in to their own calendar and address book from any Internet-capable web browsing application since the user's individual data is stored on a host server maintained by the web portal provider.

Hence, each individual is presented with a multitude of different device types and options for maintaining a "personal information space"—a data store of information customized by, and on behalf of the user which contains both public data the user puts into their personal space, private events in the space, and other data objects such as text files or data files which belong to the user.

Once information in one part of one's personal information space is defined, users are presented with the daunting task of keeping information between the different devices in the space synchronized. For example, if an individual keeps certain data files as well as a calendar of information on a personal computer in his or her office using a particular personal information manager application, the individual would generally like to have the same information available on other devices, including, for example, a cellular phone, notebook computer, hand-held organizer, and home personal computer. Generally, the individual wants to ensure that the information stored on these devices is the most current version of the data as well.

Conventionally, synchronization of documents and personal information between different devices typically occurs through direct connection between the devices.

Patent application Ser. Nos. 09/490,550 now U.S. Pat No. 6,694,336; Ser. No. 09/491,675 now copending; and Ser. No. 09/491,694, now U.S. Pat No. 6,671,757 disclose a novel method and system for synchronization of personal information including that which is conventionally found in desktop applications, personal digital assistants, palm computers, and website calendar and address services, as well as any content in the personal information space including file systems, contact information and/or calendaring information. In one aspect, the system disclosed in patent application Ser. Nos. 09/490,550 now U.S. Pat. No. 6,694,336; Ser. No. 09/491,675 now copending; and Ser. No. 09/491,694, now U.S. Pat. No. 6,671,757 comprises a series of device engines which can be utilized on or in conjunction with any personal information manager application or device, on servers, or both, which can connect via a communications network, such as the Internet, to transfer information in the form of differenced data between respective applications and respective devices. In essence, the system of patent application Ser. Nos. 09/490,550 now U.S. Pat No. 6,694,336; Ser. No. 09/491,675 now copending; and Ser. No. 09/491,694, now U.S. Pat. No. 6,671,757 creates a personal information space or personal information store that is comprised of the set of transactions which defines the movement of information between one device, the intermediate storage server, and other devices, and which is unique to an individual user or identifier.

This personal information space is defined by the content which is specific to and controlled by an individual user, generally entered by or under the control of the individual user, and which includes "public" events and data—those generally known to others—and "private" events and data which are not intended to be shared with others. It should be recognized that each of the aforementioned criteria is not exclusive or required, but defines a characteristic of the term "personal information space" as that term is used herein.

A number of different system embodiments are disclosed in the aforementioned co-pending patent applications. However, the manner in which information is input to each of the devices which may be defined as part of the personal information space varies. Certain devices take direct input from other electronic devices such as scanners or electronic input such as vCARDs. In most cases, the information must be manually input via the user interface of one of the devices, e.g. typing contact information into a computer application.

The same is true for digital media: it is accessible from sources and a user may desire to transfer all or some portion of the media within a user's personal information space. Digital media comes in many forms. Two of the most common are Moving Picture Experts Group (MPEG 1, Audio Level 3 or "MP3") encoded format and Liquid Audio format. A number of means are available for accessing digital music, including direct conversion of one's personal music collection, music from public websites such as MP3.com and decentralized file sharing programs such as Napster. However once a digital media file is within an individual's personal information space, no effective mechanism exists to move the digital media file to other devices within the personal information space. Users would benefit from a mechanism allowing them to select individual files, or all or a portion of a directory of files, and move them to different devices in the personal information space effectively and efficiently. An effective means allowing users to move digital media files around the personal information space would be a great advantage in the continued development of personal information spaces and the Internet.

SUMMARY OF THE INVENTION

The invention, roughly described, comprises a method for acquiring and maintaining a digital music store in personal information space, comprising: maintaining a personal information space identified with a user including data capable of being used on a client device, and transferring at least a portion of the data from the personal information space to an Internet-coupled device in response to a user request.

In a further embodiment, the invention comprises a method for managing information on a plurality of Internet coupled devices. In this aspect, the method comprises the steps of determining digital media content to be synchronized by reference to a user specified set of personal information devices including at least one of said plurality of Internet coupled devices; storing information in a personal information store coupled to the Internet and identified with a particular user; and providing said determined digital media content to said at least one of said plurality of Internet coupled devices in a differenced transaction.

In yet another aspect, a method of managing media information is described. In this aspect, the method comprises providing at least one information server including at least one private information store, the server being coupled to a network; and receiving change transactions from a digital media access agent, the transactions indicating to add, delete or modify digital media in the private information store.

In another aspect, a system for transferring digital media between a plurality of network coupled devices is disclosed. The system comprises a personal information store containing digital media; a data transfer request initiator coupled to the personal information store; and a device engine operatively coupled to the data transfer request initiator and responsive to the initiator to transfer digital media between the store and one of said plurality of network coupled devices.

In yet another embodiment, the invention comprises a media server coupled to an open system communications network. The server includes an information store including a user defined set of digital media; code, responsive to a request from the user, to provide digital media comprising at least one member of the user defined set of digital media to the user via a user agent.

BRIEF DESCRIPTION OF THE DRAWINGS

The invention will be described with respect to the particular embodiments thereof. Other objects, features, and advantages of the invention will become apparent with reference to the specification and drawings in which.

DETAILED DESCRIPTION

Figure 1:
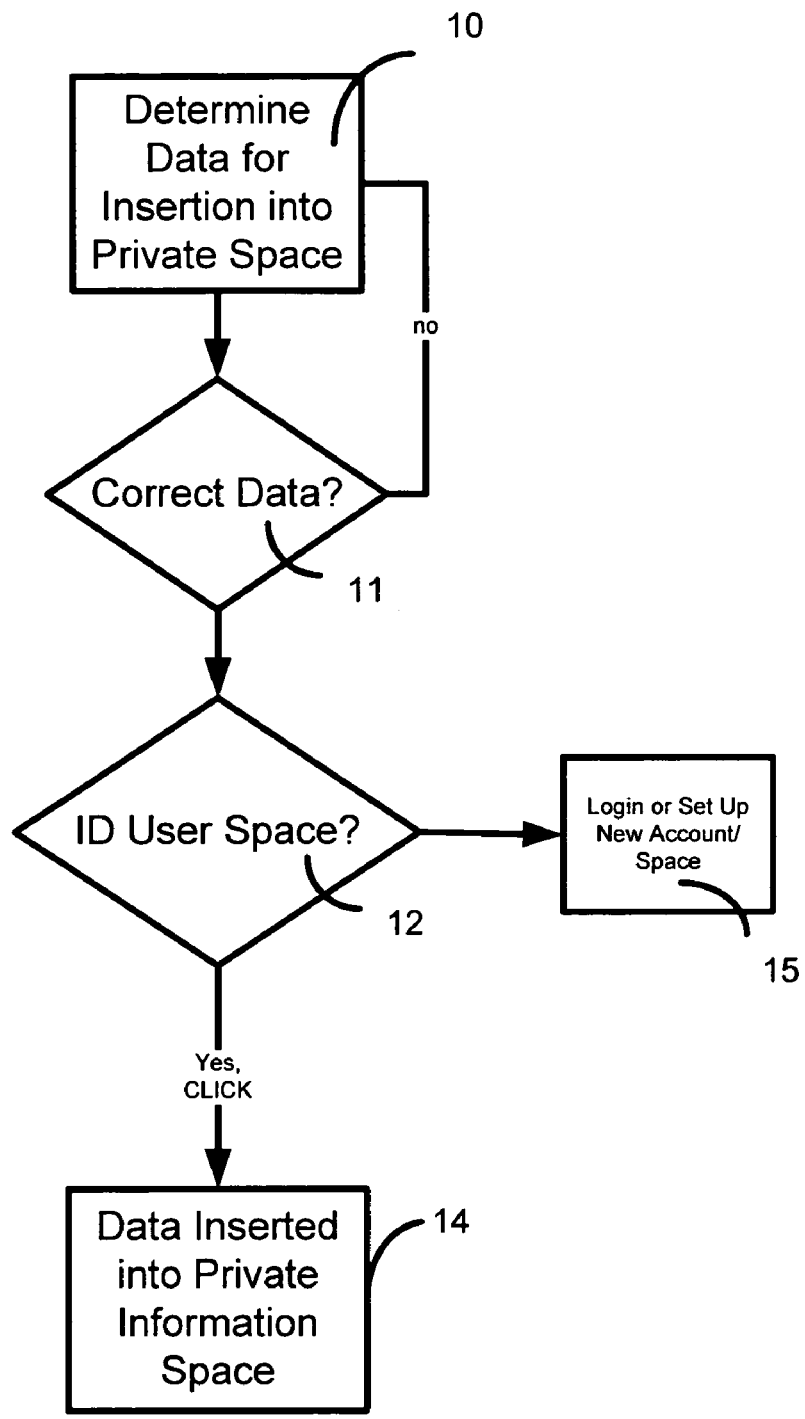
FIG. 1 is a block level diagram of one embodiment of the present invention.

In one aspect, the invention defined herein comprises a unique system and method for transferring digital media content, which is readily available in any number of sources, into a user's personal private information space. In a further aspect, the system provides a mechanism for moving data between different network-coupled devices within the personal information space.

In this case, the network to which devices are coupled may comprise the Internet, and the devices may take any number of different forms, including personal computers, notebook computers, palm-top computers, hand-held computers, so-called "smart" devices, such as Internet-coupled stereos, automotive personal computers, web appliances, and the like, and/or any device which is capable of receiving and processing digital media via a network connection. As used herein, the term "network" includes any network, including a LAN, WAN or open source global network, public or private, or any combination thereof with access to a personal information space coupled to the network, and the devices coupled to the network, are included in such reference. It should be further understood that all of the disclosed method may be performed by a distributed system. Such a distributed system may be based on a local area network (LAN) operating within a single office location, a wide area network (WAN) encompassing several office locations, oran open systems network such as the Internet. It should be further understood that devices used in accordance with the present invention may couple directly or indirectly to the global data network, and the network may comprise a private network.

The personal information space, as used herein, is defined as an individual's user-defined set of information which is uniquely identified with that individual, and which is capable of being stored on one or more systems or devices having any mechanism for storing that information. Optimally, the systems are network-coupled devices which can communicate with each other directly or indirectly.

The system of the present invention provides the ability for the user to insert data, such as digital media content, into a user's personal information space, and move the data around the personal information space to the devices which are included in and store information in the information space in an efficient and automated manner. Such data can include text information as well as binary information. For example, an MP3 file may contain text information identifying the artist and title of the work, as well as other information such as an album title or recording rate information. The MP3 will also contain binary information which is interpreted by an application to produce an output of the recorded work. In the system of the present invention, changes to either the text information or the binary information are transferred or synced, as the case may be, in a series of differencing transactions as described below.

The "personal information space" can be housed physically on an intermediate server, or it can be stored on any one or more devices which communicate with other devices. One exemplary characteristic of the personal information space is the ability to share information in the space with any of the users' personal information devices or applications, and is therefore not limited to any one type of device in direct communication with any other type of device. One example of a personal information space is the transactional based extraction, transfer, broadcast, storage and synchronization systems for forth in patent application Ser. Nos. 09/490,550 now U.S. Pat. No. 6,694,336, Ser. No. 09/491,675 now copending, and 09/491,694, now U.S. Pat. No. 6,671,757, each of which is hereby specifically incorporated by reference.

FIG. 1 shows a block diagram of a general process by which data enters a user's personal information space. At step 10, a user determines which media data (public or private) the user desires to be inserted into the user's private information space. The step of determining 10 can include any number of different data selection operations. In one aspect, it can comprise selecting a file from a file system using a standard file system interface such as a command line interface, a web browser, Microsoft Explorer, FTP, a voice command, or a specifically-designed application interface. In a further aspect, the step of determining may comprise searching using a web-based search engine to ascertain publicly available media, or secure media provided by a site the user is authorized to access, and which the user wishes to transfer into the user's personal information space. Alternatively, the user may select to include all, or one or more aspects of, a user's personal media data. In a further embodiment, selection of the data to be synchronized can be automatic. For example, a user may associate an event such as a media release with an automatic synchronization request which will automatically add to or update the user's personal information space when the event occurs. Optionally, a verification step 11 may prompt the user to confirm the data selection is correct.

A user identification step ensures that the information selected in step 10 will in fact be provided to the correct personal information space for the user selecting the data. Such identification can take place in the form of a separate login, or may use any unique identifier, such as a cookie inserted into a web browser on an individual's computer, to identify the user and the user's personal information space to which data selected at step 10 will be provided. Optionally, step 12 may be further used to allow the user to determine whether the data which has been selected in step 10 is in fact the correct data which the user wishes to be inserted into the private information space. The identifying step may comprise a pop-up window setting forth a user name and password login, can provide the user at least one opportunity to identify themselves, as well as ensure that erroneous information is not provided to his or her personal information space by incorporating the verification step 11 into the login prompt. If the data is not correct, the method returns to step 10. If the data is correct, the user may indicate his acceptance of such data by performing a user-perceptible action, such as clicking on a virtual button in the web browser or other application, depressing a hardware switch, providing a voice command, or any other indicative action signifying virtual correctness of the data. If the user's ID is not ascertained, then the user may be provided the option of establishing a personal information space at step 15. At step 14, if the user's ID is verified, the data is inserted into the private information space. Once inserted into the private information space, the data can be synchronized to any number of different devices as described in patent application Ser. No. 09/490,550 now U.S. Pat No. 6,694,336; Ser. No. 09/491,675 now copending; and Ser. No. 09/491,694 now U.S. Pat No. 6,671,757.

Figure 2:
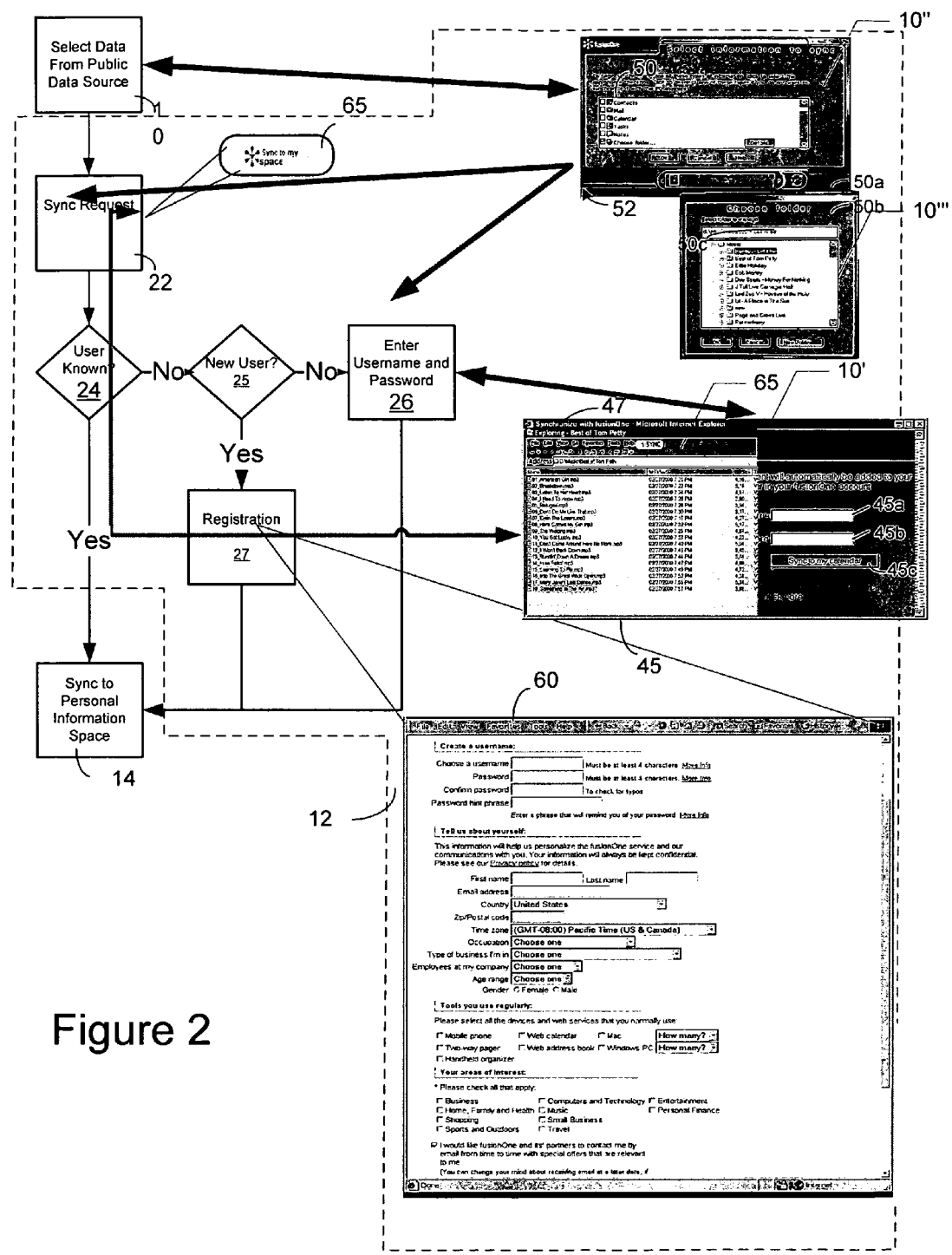
FIG. 2 is a block diagram of one example of user interaction with the system and method of the present invention.

FIG. 2 shows one manner in which media information may be inserted into private information space. The method shown in FIG. 2 is shown from an individual user's perspective of how the steps in the method occur.

As noted above, personal or public media information from, for example, a file system stored on a server or private data store may be utilized in accordance with the system of the present invention. In the example shown in FIG. 2, an explorer window view 10' of a particular file system and a directory selection application, allowing access to particular file system folders via a window view 10" are shown as two alternative methods of selecting media data. In window 10', a user may select one or more of the files listed in the file system window and press a sync button 65 which may be provided on the menu bar of the window. Pressing sync button 65 in conjunction with selecting data in the window initiates a sync request which then allows data to be moved into the personal information space in accordance with steps 24-27 and 14. Window 10" shows a mechanism for selecting one or more folders by depressing the "okay" button 66 in selection window 10''', thereby designating that all files in the file system folder are to be synchronized into the personal information space. Alternate forms of selection of media data, such as, for example, those enunciated above or simply interacting with a web page enabling a sync request by clicking on a button 65 in a web page are contemplated. It should be further recognized that the synchronization may be two-way or one-way: that is, files from the space may be moved to the individual folders shown in FIG. 10''' or into the file system shown in FIG. 10' from file system shown in FIG. 10' and 10'''. Alternatively, the system may be utilized to ensure that media entering or changed in one or more of the file systems have changes reflected in selected devices which are part of the information space, as described below.

After data is selected at step 10, a sync request at step 22 is placed by the user. It should be recognized that other alternatives for initiating the sync request may be utilized in accordance with the present invention. The button may be physical or virtual, and may comprise menu selection, a virtual button, a combination of keystrokes, or any other user-initiated user-interface event.

Following the sync request at step 22, a determination of whether the user is known to the personal information space 14 must be made. At step 24, a yes answer may comprise the affirmative identification of the user's identity from a cookie placed on the user's web browser on the user's personal computer. Other forms of identification may alternatively be used, such as remembering the user's identity from the previous login entry, or other forms of unique identification.

If the user's identity is not known, and the user is not a new user, at step 26 the user is provided with an opportunity to enter the username and password. It should be recognized that the username and password in this instance may provide a system login entry, however all that is required is the provision of a unique identifier to the personal information space to which the digital media is to be synchronized. It should be further recognized that the temporal relationship between the login process at step 26 and the determination of a new user at step 25 need not occur in any particular order. Graphics 45 shows how a username and password might be entered into the step 26. As shown therein, a dialog box 47 may be provided adjacent to the explorer window so that such information might be added. Alternatively, a separate window may be provided with fields 45a, 45b and sync button 45c to enable the digital media information to be entered into the personal information space. The user may thus provide the unique identifier user name and password to the system of the present invention in order to identify the personal information space to which data is to be inserted at step 14.

If the user is a new user, at step 25, a registration interface 27 may be provided so that the user may identify a new unique personal information space for that particular user. Registration may include providing information as shown in window 60 to identify the user's personal information space. It should be recognized that the information shown in window 60 is exemplary and, at a minimum, all that is required is a unique user name to be associated with the personal information space.

Once the user information space is identified, the data can be inserted into the user's unique personal information space at step 14.

Figure 3:
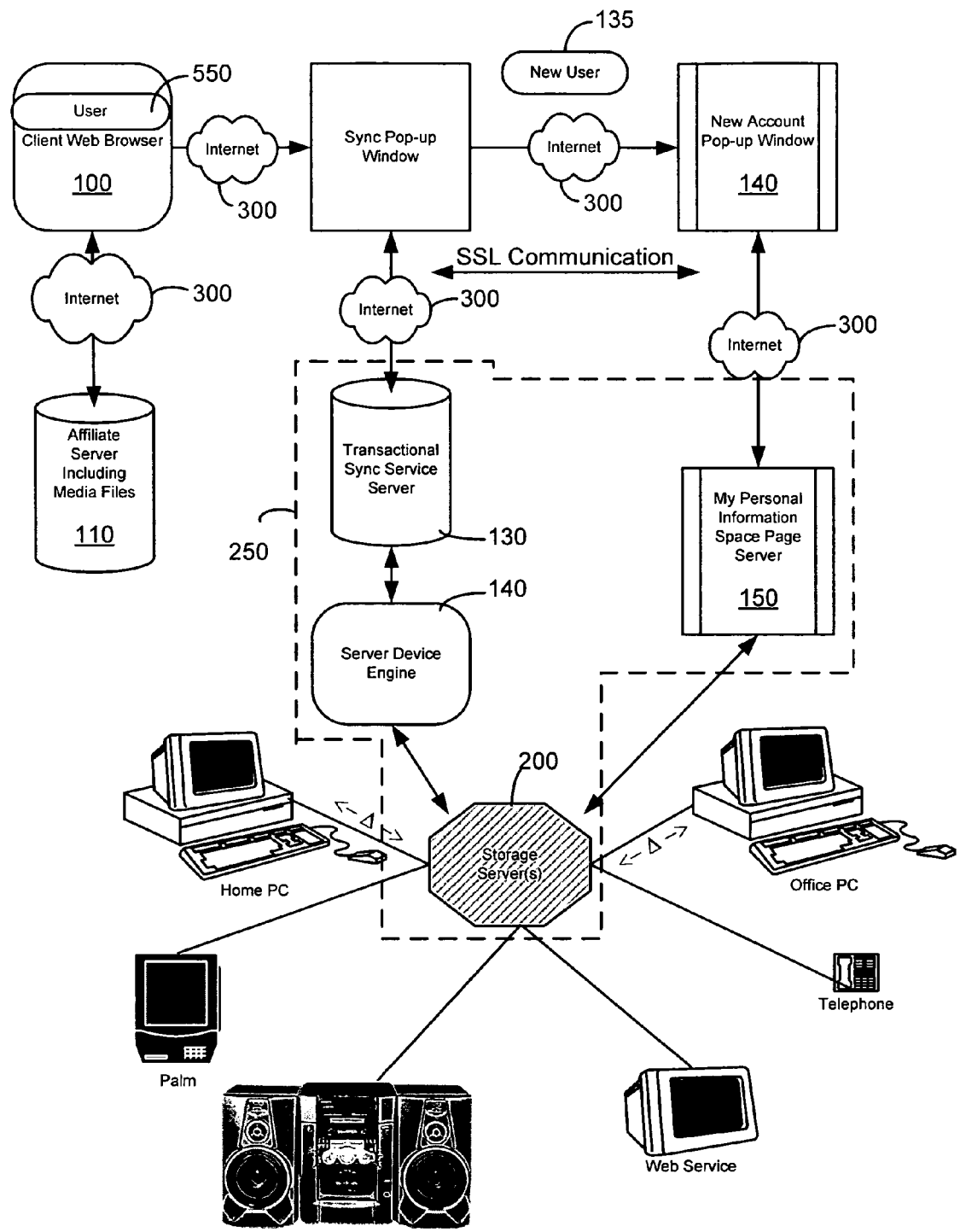
FIG. 3 is a diagram illustrating one manner by which digital music data enters the system of the present invention and is placed into personal information space.

FIG. 3 illustrates one manner by which data may enter the personal information space of a particular user. FIG. 3, in one instance, represents an extension of the method shown in FIG. 2 wherein a user selects media data from a public (or private) source. It should be understood that information may be added to the private information space by any number of means, and the method shown in FIG. 3 is only one exemplary method for doing so.

In FIG. 3, a user 550 interacts with, for example, a browser application 100, such as a World Wide Web browser, which allows the user access to an information store. The store may be any public or private storage server coupled to a network, such as, for example, the Internet. While the present invention will be described with respect to its implementation in an Internet environment wherein the interface is a client browser 100, it should be recognized that the user may act with other types of systems to access content, including a private file system via a command line or graphic interface, a telephone having access to media information via a wireless network connection (such as a cellular phone equipped with a Wireless Application Protocol (WAP) browser), a personal computer, network-connected content managers, or any other hardware or software applications which may provide data to the personal information space.

In the example of FIG. 3, user 550 connects to server 110 which may be affiliated with an administrator of the private information space in order to more readily implement the functionality described herein. Alternatively, server 110 may be any publicly accessible server.

Generally, media information may be provided on any network-coupled storage device or server. In the affiliate server 110 shown in FIG. 3, code, such as HTTP protocol code, is provided which allows the implementation of the transference of public data from the affiliate server to the user's private information space.

In one case, the affiliate server 110 may comprise an Internet World Wide Web server such as that as may be provided by a web portal service, such as Yahoo!™, Excite$^{SM}$Lycos®, MSNBC, or MP3.com, which provide an interface to public media content. Affiliate server 110 may also comprise a specialized web server such as a music, video or other media file service provider, a performance group's web server, an online retailer's web server, a shared network server running a media-sharing application such as Napster or Gnutella, or any number of different types of Internet-based sources providing media content which a user will desire to synchronize with the user's personal information space. The affiliate server could also be a simple file server which provides access to data files and enables synchronization to the personal information space by implementing HTTP code in accordance with the following description using a secondary link or re-direct.

Affiliate server 110 may include, for each piece of content which the affiliate server system administrator deems appropriate for such synchronization, code enabling the display of a synchronization implementation interface, such as button 65 on a file system display 10', shown in FIG. 2. In this example, when a piece of data is provided by the affiliate server which a user wishes to synchronize to the private information space, the user marks the data by, for example, highlighting it, and then "clicks" button 65 to initiate the synchronization process. Following clicking on button 65, a sync pop-up window 120 will be provided by a sync service server 130.

Sync server 130 is maintained by a sync service administrator who may control portions of the system of the invention denoted as being within dashed line 250. A servlet provided on the sync server 130 records selection of the media information to be transmitted to the personal information space and displays the data/login window. Each servlet requires that an affiliate ID (AID) be provided along with the actual media information, which can then be transferred to the user's specific personal information space upon provision of the identifier for the personal information space.

If the user is known, sync server 130 can provide the information set forth above directly to a server device engine 140 which can then transfer the information to the personal information space stored in a database 200 as described in the patent application Ser. Nos. 09/490,550 now U.S. Pat. No. 6,694,336; Ser. No. 09/491,675 now copending; and Ser. No. 09/491,694, now U.S Pat No. 6,671,757. The interaction of the storage server 200 with the device engine 140 is described in further detail below.

If a user is not known, a new user registration routine is initiated at step 135, and a new account pop-up window 145 is generated. Communication between the synchronization pop-up window 120 and the new account pop-up window 145 may occur by secure socket layer (SSL) communication. The new account pop-up window will be provided by a web server 150 which may comprise a user interface specifically tailored to the individual user's personal information space. Through web server 150, the user is allowed to customize the types of devices and the types of information which are provided to those devices in the personal information space 200. Communication between the sync service server 130 and the server device engine 140 can occur behind the firewall provided by the sync service provider and hence there is no need for secure communication between the engine and the sync service server.

Figure 4:
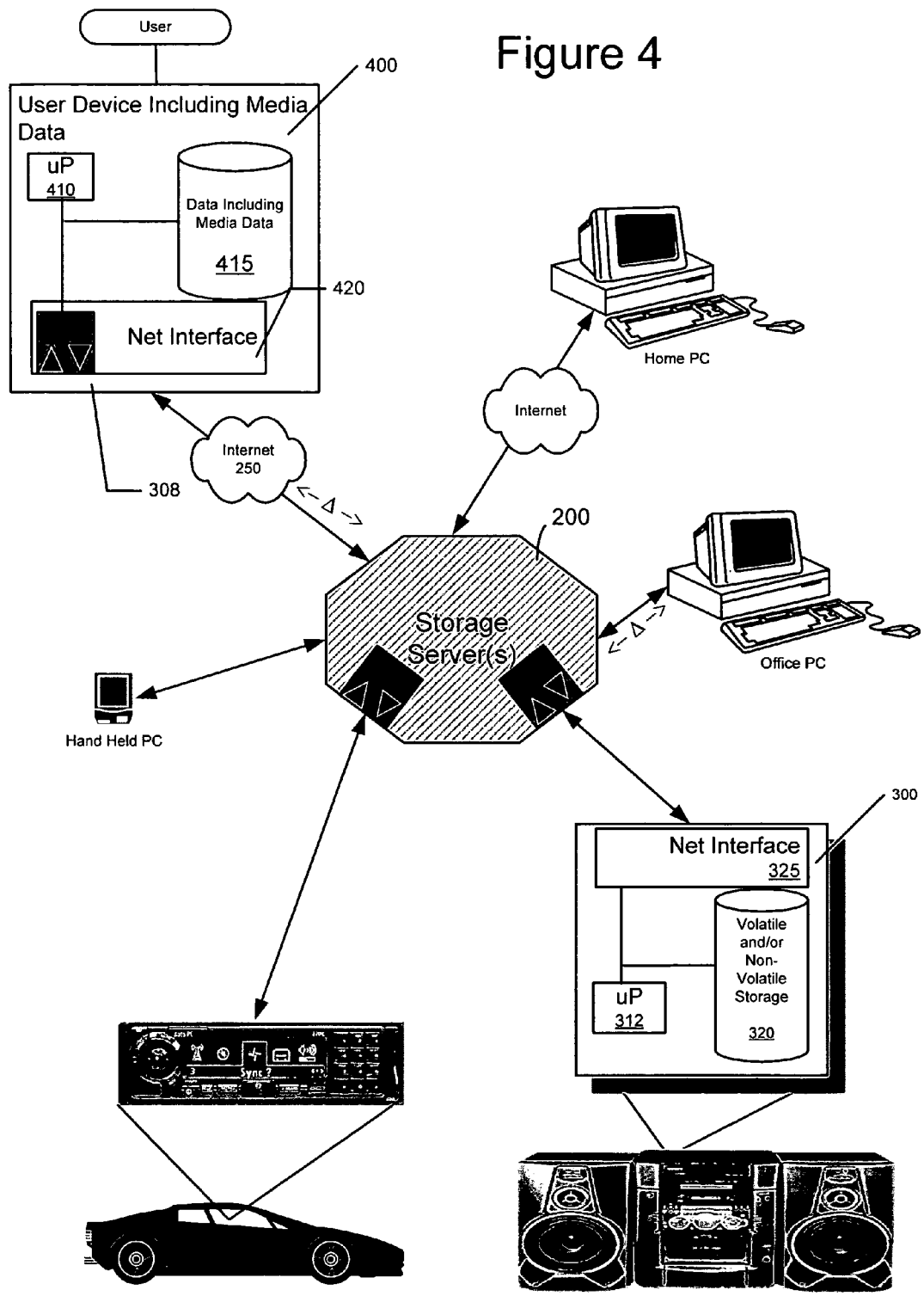
FIG. 4 is a block diagram illustrating the different types of devices and device engines incorporated into the system of the present invention.

One example of media information which may be provided into personal information space is to utilize the aforementioned system on a public information server which allows transference of data files, such as executables, documents, or digital music files (MP3's) from the public information space to the personal information space. As shown in FIG. 4, data from storage server 200 is then considered part of the personal information space and may be thereafter synchronized to any one or all of the devices coupled within the user's space, including personal computers, PDA's, automotive PC's, and the like.

FIG. 4 shows an exemplary embodiment of the system of the present invention including a mechanism for synchronizing personal information space provided in a storage server 200 with a generic Internet appliance 400 shown in FIG. 4. Also shown are specific examples of Internet appliances which may be coupled to the storage server 200. Generic user device 400 may be a personal computer which includes a microprocessor 410, data included in volatile or non-volatile memory 415, and a network interface 420. Network interface 420 may comprise either a direct connection via a wireline or wireless coupling to the Internet 250 or an interface to another device which can connect to the storage server 200 either directly or via a local area network, a wide area network or open source global network. The device 400 requires only enough processing power and memory to decode the data stream provided from server 200.

In one embodiment, the network coupled device may be an Internet-coupled stereo 300 having a microprocessor 315, volatile and/or non-volatile memory 320, and a network interface 325.

Shown in conjunction with storage server 200 are server device engines 202 and 204. Server device engines 202, 204 are used primarily where the network coupled device does not include enough memory or power to efficiently run the device engine on the device itself. Each device engine includes components acting in conjunction with applications, file structures, and devices to extract media data to be synchronized and construct one or more transactions comprising difference data to be exchanged with other devices and device engines in the personal information space in order to move data between devices and the storage server 200.

In accordance with the present invention, digital media files of varying formats, and other data, may be synchronized or transferred (uni-directionally) to any network coupled appliance 400 utilizing the system of the present invention. Alternatively, no storage need occur on the network device, but digital media may be broadcast by device engines 202, 204 to device 300 which decodes the broadcast stream on the fly (or with buffering of the stream) to provide digital media content to an output of the device. Any number and type of devices, either capable of supporting a device engine 308 on the device, or coupled to a server device engine 202 on the storage server 200, may be used in accordance with the present invention.

Figure 5:
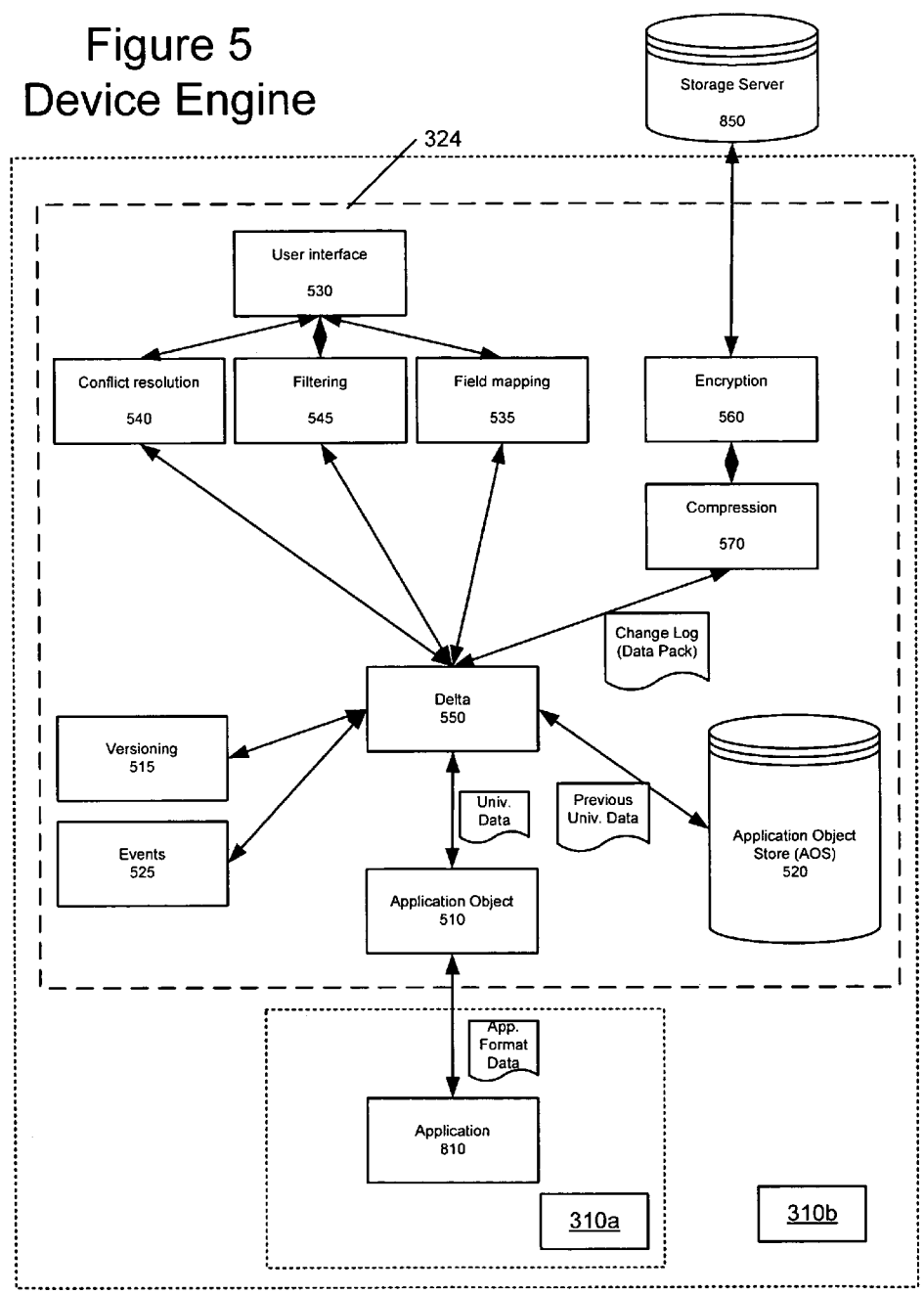
FIG. 5 is a block diagram of one example of a device engine in accordance with the present invention.

The specific structure and operation of the server and client based device engines are described generally with respect to FIG. 5 and are disclosed in further detail in patent application Ser. Nos. 09/490,550 now U.S. Pat No. 6,694,336; Ser. No. 09/491,675 now copending and 09/491,694, now U.S. Pat. No. 6,671,757.

In general, PCs such as those illustrated in FIG. 4 will likely have their own device engine, while hand-held PCs and automotive PCs also disclosed in FIG. 4 will not.

FIG. 5 shows an example of a client device engine 324 utilized in accordance with the present invention for synchronizing media data.

In general, an individual device engine for each device which is a part of the private information space is provided, and is distributed across the collection of devices comprising the personal information space. Distribution of the device engines may occur via, for example, an installation package forwarded over the network from storage server 200 or another distribution point, or may be loaded by conventional means (a diskette, CD ROM, DVD installation disk) onto server 400.

FIG. 5 illustrates a device engine wherein all processing occurs on the device and only difference information is transmitted to server 200. The client device engine 324 shown in FIG. 5, may be operable entirely within the construct 410 of Internet appliance 400. Alternatively, portions of the device engine may be provided on the network appliance 400, with other portions on the storage server. Alternatively, a server based device engine may be entirely located on storage server 200 as a stand-alone device engine which merely interacts with an application programming interface of network device 400.

As shown in FIG. 5, each device engine 324 includes an application object 510. The application object is specific to each particular software application 810 running on the network-coupled device, and provides a standard interface between the device engine and the balance of the data transmission system of the invention, and the application 810. Details of the application object will be described below. The application object is a pluggable architecture which supports a wide variety of vendor-unique applications and file structures. The job of the application object is to map data from the application into a temporary or "universal" data structure by connecting to the application via any number of standard interfaces to gain access to the applications data. The data structure of the application object puts the data in a generic or "universal data" format which may be used by the device engine components to generate data packages for provision to the storage server.

It should be specifically noted that the application object may interface directly unstructured binary data such as digital media files (using the aforementioned XDelta routine) or with structured application data such as contact and calendar information (resolving items at the field level of information in a given record). The differencing routine supports both uses of the delta module 550 in comparison generation.

Also provided is an application object store (AOS) 520 which includes a copy of the device's data at a point just after the previous data extraction and synchronization occurred. Application object store 520 is a mirrored interface which stores a snapshot of the previous state of the data from the application object 510 in the device engine. In the case of the device engine for network devices having minimal nonvolatile storage, the AOS may be provided on the server 200 to conserve space on the network device. The size of the AOS will depend on the data being collected by each device engine. The AOS is one component in particular which may be offloaded to a server to conserve space on the network device in one hybrid device/server device engine embodiment.

The generic output of the application object is provided to a delta module 550. Delta module 550 is a differencing engine which calculates differences in data between the output of the application object 510 and the copy of the data which is provided in an application object store (AOS) 520. The actual differencing and patch routine can comprise a routine such as XDelta or YDelta. The delta module 550 will be referred to herein alternatively in certain portions of the description as "CStructuredDelta." In addition, the difference information is alternatively referred to herein as a "change log." Each change log (or set of difference information) is a self describing series of sync transactions. As described below, the change log may be encrypted and compressed before output to the network and server 200.

Hence, during a sync or transfer, the Application Object will, using a mechanism discussed below, extract the data of each application in the device and convert it to a universal data format. The delta module will then generate a difference set by comparing the output of the Application Object and the AOS. This difference information is forwarded to the encryption and compression routines for output to the storage server 550 in the form of a data package.

Device engine 560 further includes a versioning module which applies a version number per object in the data package. As explained further below, each object in the data package is assigned a universally unique ID (UUID). Hence, unlike many prior synchronization systems, the system of the present invention does not sync data solely by comparing time stamps of two sets of data. Versioning module 515 allows each device engine to check the state of the last synchronization against data packs which have been provided to the storage server to determine which data packages to apply. This allows the device engine to sync itself independently of the number of times another device engine uploads changes to the storage server. In other words, a first device engine does not care how many times a second device engine uploads data packages to the server.

An events module 525 controls synchronization initialization events. Items such as when to sync, how to sync, trigger the delta module 550 to perform a synchronization operation.

A user interface 530 is provided to allow additional functional features to a system user of the particular device to which the device engine 560 is coupled. The user interface is coupled to a conflict resolution module 540, a filtering module 545, and a field mapping module 535. Each of the modules provides the functionality both necessary for all synchronization programs, and which users have come to expect. In one aspect the user interface may be a unique application allowing the user to identify data to be transferred and presenting data manipulation options, or may be as simple as a sync button on a standard interface such as a file listing display window.

Where non-binary data is being transferred, filtering module 545 allows filtering for types of content based on, for example, a field level content search. The field mapping module 535 allows for the user to re-map certain interpretations of items which were provided in the document stream. It should be recognized that the field mapping module allows for changes in directing the output of the data package. The field mapping module 535 is not necessary to map particular data fields of, for example, contact information from one application, such as Microsoft Outlook, to a different application, such as Symantec's ACT, as is the traditional use of field mapping and synchronizing applications.

Delta module 550 is further coupled to a compression module 570 and an encryption module 560. It should be recognized that the compression encryption modules need not be enabled. Any type of compression module 570, such as the popular PK Zip or Winzip modules, or those available from HiFn Corporation may be utilized in accordance with the invention. Moreover, any type of encryption algorithms, such as MD5, RCH 6, Two Fish, or Blowfish, or any other symmetric encryption algorithm, may be utilized. In one embodiment of the invention, encryption without compression is used. In a second embodiment of the invention, compression without encryption is used. In a third embodiment of the invention, neither compression or encryption is used, and in a fourth embodiment of the invention, both compression and encryption are used.

Versioning module 515 also allows the device engine 324 to support multiple users with distinct synchronization profiles. This allows multiple users accessing the same machine to each synchronize their own data set using the same device engine.

The output of the device engine 324 comprises a data package which is output to storage server 850. As noted above, only one device engine need be connected to the storage server 850 at a given time. The data package can be stored on the storage server 850 until a request is made to a particular location of the storage server by another device engine. Likewise, delta engine 324 can query alternative locations on the storage server for access to synchronized data within the system of the present invention. In one embodiment, each sync operation requires that the device engine for each device login to a management component of the system server to authenticate the device and provide the device engine with the location of the individual device's data packages on the storage server.

Data packages may be advantageously provided to the device engine from the storage server in a streaming format, allowing processing to occur using a minimum of bandwidth and storage in the devices. This is particularly advantageous in applications involving large files, such as digital media files.

The device engine 534 and particularly the delta module 550 interpret data packages based on the versioning information and the mirrored data present in the application object store 520. When data is returned to the delta module 550 from the storage server 300, the delta module returns differenced data to the application object 510 for the particular application which then translates the delta information into the particular interface utilized for application 510. Once a device engine has been fully applied all data packages from an input stream, it generates a series of data packages that describe the changes made on the local system. The device engine uses the local application object store 520 to keep track of the last synchronized version of each application's actual data, which is then used for the next data comparison by the delta module on the next sync request. Generated data packages can include operations and encode changes generated from resolving ambiguous cases as described above.

Each Application Object (AO) is a software component that interfaces with the third party application APIs (Application Programming Interface) to provide the programming services to the delta module for extraction and deposition of information data from and to the third party application domain during synchronization. In addition, the AO maps the third party application data fields in non-binary information to the system's domain. With binary files, the AO allows changes to be applied to binary files within the file structure of the target client. (For example, MP3 files can be uploaded from a Microsoft Windows machine to the storage server, then downloaded to a Linux file structure).

In the Microsoft Windows device engine, the AO service is a collection of COM (Component Object Model) objects that can be developed in conjunction with, for example, third party Windows application APIs as a form of a DLL (Dynamic Linked Library) in C or C++. The DLL may be loaded on demand at runtime during synchronization. It should be recognized that the application object need not be implemented using the COM model, but may be developed with other distributed object models.

Each AO has a COM interface-based design built-in. That is, instead of providing a set of traditional APIs as programming services, it provides a set of interface-based objects as programming services.

The delta module 550 instantiates these COM objects and uses them throughout the synchronization session exclusively through the COM interfaces on those objects to interface with the third party application database.

For calendar or PIM information, each AO component consists of a set of objects that translate the third party application data into the universal data middle format which underpins the entire spectrum of PIM data regardless of which third-party application the data comes from. The objects in universal data format are device, (application) data class, store, folder, item, and data fields. The AO digests the third party application data of any kind and reduces it into a few handful simple objects and field types. These objects and field types are fed into the delta module engine and are compared by the delta module in order of their hierarchy. The resulting differences (add, delete, modify) are logged as transactions in the difference information. The data packs are transported to a storage server that may be actively managed by a management server for each individual user account and devices.

The delta module 530 uses AO objects to access and modify the individual AO objects and data fields. AO objects serve as a buffer between individual application data and the delta module so that the delta module does not require knowledge of each application and database. All AO objects are temporary and created in the space of each AO by the delta module through COM interfaces. AO objects are referenced when they are in use and they are freed when the delta module stops using them. One can think of AO objects as merely placeholders of each application objects for the delta module to access. Once the delta module has a particular Application's data, the delta module frees AO objects immediately without storing them internally.

Hence, a user can, via the Internet, select music files for transference to the user's personal information space and output such files on any device which is coupled to a network.

The many features and advantages of the present invention will be apparent to one of average skill in the art. All such features and advantages are intended to be within the scope of the invention as defined by the above specification and the following claims.

What is claimed is:

1. A method of transferring media data to a network coupled apparatus, comprising:
    (a) maintaining a personal information space identified with a user including media data comprising a directory of digital media files, the personal information space being coupled to a server and a network;
    (b) generating a first version of the media data in the personal information space;
    (c) generating a digital media file, in response to an input from the user, comprising a second version of the media data in a same format as the first version in the personal information space, the second version including an update not included in the first version;
    (d) obtaining difference information comprising differences between the first version of the media data and the second version of the media data; and
    (e) transferring a digital media file over the network containing the difference information from the personal information space to the network coupled apparatus in response to a sync request made from a web browser at the network-coupled apparatus by the user.

2. The method of claim 1 further including the step, prior to step (a), of receiving information into the personal information space.

3. The method of claim 2 wherein the step of receiving comprises receiving data from a first network coupled apparatus, and said step (e) includes transferring said media data to a second network coupled apparatus.

4. The method of claim 1, wherein the network coupled apparatus is an automotive computer.

5. The method of claim 4 further including the step, following step (a), of identifying the personal information space associated with the user by prompting a user login from said automotive computer and retrieving login information input by the user.

6. The method of claim 1 wherein the media data comprises a directory of digital media files.

7. The method of claim 1 wherein said step (a) comprises providing a storage server having a network connection, and code on the storage server interacting with the personal information space.

8. The method of claim 1 wherein the method further includes:
    (f) providing code on a network-coupled apparatus which receives said difference information and stores the difference information on the network-coupled apparatus.

9. The method of claim 1 wherein said step of transferring comprises instantiating code on a network-coupled server storing said personal information space to output the difference information to the network-coupled apparatus.

10. The method of claim 1 wherein said step of transferring comprises instantiating code on the network-coupled apparatus to retrieve the difference information.

11. A system for transferring digital media between a plurality of network coupled devices, comprising:
    a personal information store identified with a user containing digital media comprising a directory of digital media files readable by an application program; and a processing device, a server and a network coupled with the personal information store, the processing device including:
    an application data store holding a version of the digital media in the personal information store, and a device engine to: a) generate a digital media file, in response to an input from the user, comprising a second version of the media data in a same format as the first version in the personal information store, the second version including an update not included in the first version; (b) obtain difference information comprising differences between the first version of the media data and the second version of the media data; and (c) transfer a digital media file over the network containing the difference information from the personal information space to the network coupled apparatus in response to a sync request made from a web browser at the network-coupled apparatus by the user.

12. The system of claim 11 wherein the personal information store is provided on a server.

13. The system of claim 12 wherein the server is coupled to the Internet.

14. The system of claim 11 wherein the device engine is provided on a server which includes at least a portion of the personal information store.

* * * * *

UNITED STATES PATENT AND TRADEMARK OFFICE
CERTIFICATE OF CORRECTION

| | | |
|---|---|---|
| PATENT NO. | : 7,587,446 B1 | Page 1 of 1 |
| APPLICATION NO. | : 09/710162 | |
| DATED | : September 8, 2009 | |
| INVENTOR(S) | : Onyon et al. | |

It is certified that error appears in the above-identified patent and that said Letters Patent is hereby corrected as shown below:

Title Page
Page 3, References

Page 3, which is a continuation of Cover Page field (56) References Cited, please replace "2004/0188235" with "2004/0192260" so that the field correctly reads -- 2004/0192260 A1   9/2004  Sugimoto et al. .......... 455/412.1 --

Signed and Sealed this

Twenty-third Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,587,446 B1
APPLICATION NO. : 09/710162
DATED : September 8, 2009
INVENTOR(S) : Onyon et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1248 days.

Signed and Sealed this

Twenty-first Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,587,446 C1 | |
| APPLICATION NO. | : 95/002299 | |
| DATED | : September 26, 2013 | |
| INVENTOR(S) | : Onyon et al. | |

It is certified that error appears in the above-identified patent and that said Letters Patent is hereby corrected as shown below:

In the Claims

At column 2, line 3, Claim 15, please replace "The system" with "The method" so that Claim 15 reads – The method of claim 1 –.

At column 2, line 5, Claim 16, please replace "The system" with "The method" so that Claim 16 reads – The method of claim 1 –.

At column 2, lines 6-7, Claim 16, please replace "the plurality of network coupled devices." with "a plurality of network coupled apparatuses." so that Claim 16 reads – one of a plurality of network coupled apparatuses. –.

At column 2, line 12, Claim 18, please replace "The system" with "The method" so that Claim 18 reads – The method of claim 2 –.

Signed and Sealed this
Twenty-first Day of July, 2015

Michelle K. Lee
*Director of the United States Patent and Trademark Office*

(12) INTER PARTES REEXAMINATION CERTIFICATE (699th)
United States Patent
Onyon et al.

(10) Number: US 7,587,446 C1
(45) Certificate Issued: Sep. 26, 2013

(54) ACQUISITION AND SYNCHRONIZATION OF DIGITAL MEDIA TO A PERSONAL INFORMATION SPACE

(75) Inventors: Richard M. Onyon, San Jose, CA (US); David L. Multer, Santa Cruz, CA (US)

(73) Assignee: Synchronoss Technologies, Inc., Bridgewater, NJ (US)

Reexamination Request:
No. 95/002,299, Sep. 14, 2012

Reexamination Certificate for:
Patent No.: 7,587,446
Issued: Sep. 8, 2009
Appl. No.: 09/710,162
Filed: Nov. 10, 2000

Certificate of Correction issued Feb. 23, 2010
Certificate of Correction issued Sep. 21, 2010

(51) Int. Cl.
*G06F 15/16* (2006.01)
*G06F 15/173* (2006.01)
*G06Q 10/10* (2012.01)
*H04L 29/00* (2006.01)

(52) U.S. Cl.
USPC ............. 709/203; 707/999.01; 707/999.202; 709/217

(58) Field of Classification Search
None
See application file for complete search history.

(56) References Cited

To view the complete listing of prior art documents cited during the proceeding for Reexamination Control Number 95/002,299, please refer to the USPTO's public Patent Application Information Retrieval (PAIR) system under the Display References tab.

*Primary Examiner* — Mary Steelman

(57) ABSTRACT

A method for transferring media data to a network coupled apparatus is described. The method includes maintaining a personal information space identified with a user and having media data. The personal information space is coupled to the network. Upon a user request, the method transfers at least a portion of the media data from the personal information space to the network coupled apparatus in a differencing transaction.

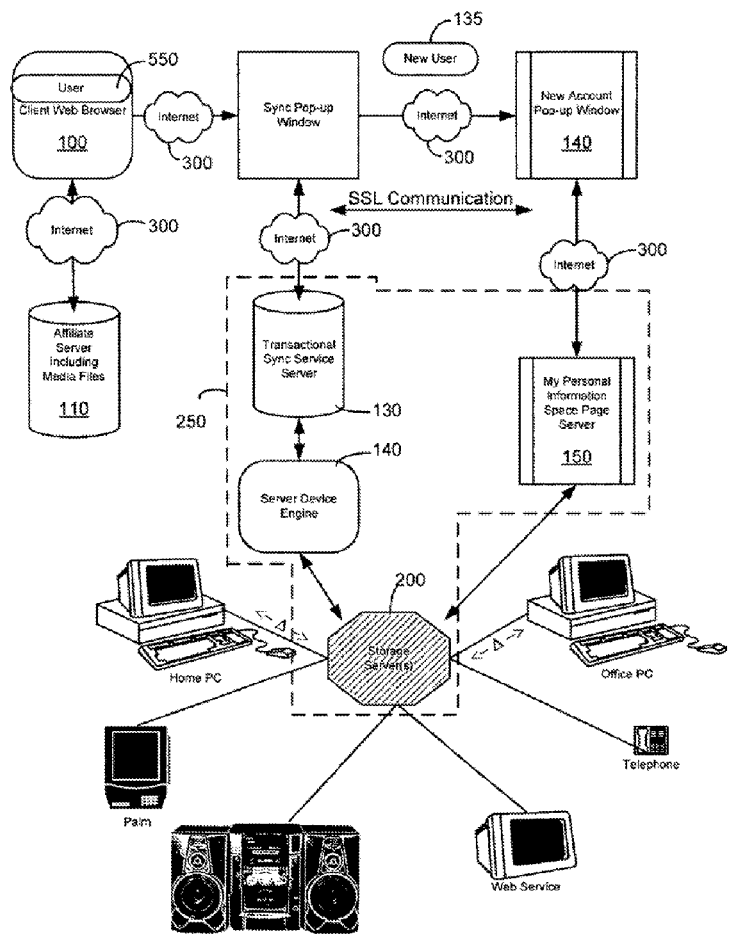

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2 and 6 is confirmed.

New claims 15-20 are added and determined to be patentable.

Claims 3-5 and 7-14 were not reexamined.

*15. The system of claim 1 wherein the personal information space is provided on the server.*

*16. The system of claim 1 wherein the personal information space is provided on one of the plurality of network coupled devices.*

*17. The method of claim 1 further including the step, following step (e), of translating the difference information into a specific interface utilized by an application on the network-coupled apparatus.*

*18. The system of claim 2 wherein the step of receiving includes utilizing an XDelta routine to facilitate generation of difference information.*

*19. The method of claim 2 wherein the information is in a universal data format.*

*20. The method of claim 2 wherein the information is encrypted and compressed.*

\* \* \* \* \*